United States Patent
Pandit

(10) Patent No.: US 9,201,754 B2
(45) Date of Patent: Dec. 1, 2015

(54) RECORDING APPLICATION CONSUMPTION DETAILS

(75) Inventor: Rakesh Pandit, Jammu (IN)

(73) Assignee: Red Hat, Inc., Raleigh, NC (US)

( * ) Notice: Subject to any disclaimer, the term of this patent is extended or adjusted under 35 U.S.C. 154(b) by 941 days.

(21) Appl. No.: 13/009,192

(22) Filed: Jan. 19, 2011

(65) Prior Publication Data

US 2012/0185584 A1  Jul. 19, 2012

(51) Int. Cl.
*G06F 11/34* (2006.01)
*G06F 9/44* (2006.01)

(52) U.S. Cl.
CPC .......... *G06F 11/3466* (2013.01); *G06F 11/349* (2013.01); *G06F 11/3409* (2013.01); *G06F 2201/865* (2013.01)

(58) Field of Classification Search
CPC ....................................................... G06F 21/10
USPC ................................................. 717/127, 163
See application file for complete search history.

(56) References Cited

U.S. PATENT DOCUMENTS

| | | | |
|---|---|---|---|
| 5,490,249 A | 2/1996 | Miller | |
| 5,634,114 A | 5/1997 | Shipley | |
| 5,652,835 A | 7/1997 | Miller | |
| 5,684,952 A | 11/1997 | Stein | |
| 5,933,642 A * | 8/1999 | Greenbaum et al. | 717/140 |
| 6,862,696 B1 | 3/2005 | Voas et al. | |
| 7,003,560 B1 | 2/2006 | Mullen et al. | |
| 7,150,008 B2 | 12/2006 | Cwalina et al. | |
| 7,209,970 B1 | 4/2007 | Everson et al. | |
| 7,210,141 B1 | 4/2007 | Nathan et al. | |
| 7,225,462 B2 | 5/2007 | Bass et al. | |
| 7,278,059 B2 | 10/2007 | Hughes | |
| 7,600,219 B2 | 10/2009 | Tsantilis | |
| 7,634,770 B2 | 12/2009 | Roth | |
| 8,166,492 B2 | 4/2012 | Fathalla | |
| 8,332,817 B2 | 12/2012 | Li et al. | |
| 8,364,164 B2 * | 1/2013 | Phatak et al. | 455/456.1 |
| 8,719,808 B1 * | 5/2014 | Prinzing | 717/162 |
| 2002/0026631 A1 * | 2/2002 | Barritz | 717/127 |
| 2004/0015870 A1 | 1/2004 | Arbouzov et al. | |
| 2004/0044996 A1 | 3/2004 | Atallah | |
| 2004/0054946 A1 | 3/2004 | Atallah et al. | |

(Continued)

OTHER PUBLICATIONS

Chakrabarti et al. "Interface Compatibility Checking for Software Modules," Computer Aided Verification; 14th International Conference, CAV 2002 Copenhagen, Denmark, Jul. 27-31, 2002, 14 pg.

(Continued)

*Primary Examiner* — Ryan Coyer
(74) *Attorney, Agent, or Firm* — Lowenstein Sandler LLP

(57) ABSTRACT

A consumption data monitoring method may identify an interface provided by an operating system running on a server. A monitoring module populates an operating system database with information on the identified interface. The monitoring module populates a host database with consumption details received from a host machine, the consumption details comprising one or more interfaces of an operating system on the host machine used by a computer application program running on the host machine. The monitoring module compares the host database to the operating system database to determine if the interface provided by the operating system running on the server matches the one or more interfaces of the operating system on the host machine.

15 Claims, 5 Drawing Sheets

(56) References Cited

U.S. PATENT DOCUMENTS

| | | | |
|---|---|---|---|
| 2004/0054988 | A1 | 3/2004 | Atallah et al. |
| 2005/0065932 | A1 | 3/2005 | Rocha |
| 2005/0125778 | A1 | 6/2005 | Fleegal |
| 2005/0193266 | A1 | 9/2005 | Subramanian et al. |
| 2005/0228693 | A1* | 10/2005 | Webb et al. ............. 705/2 |
| 2006/0161910 | A1 | 7/2006 | Bonsteel et al. |
| 2006/0288344 | A1 | 12/2006 | Brodersen et al. |
| 2007/0168957 | A1* | 7/2007 | Li et al. ............. 717/120 |
| 2007/0226341 | A1* | 9/2007 | Mateo ............. 709/226 |
| 2007/0250621 | A1 | 10/2007 | Hillier |
| 2008/0270996 | A1* | 10/2008 | Choi et al. ............. 717/129 |
| 2010/0138908 | A1 | 6/2010 | Vennelakanti et al. |
| 2011/0113409 | A1* | 5/2011 | Evans et al. ............. 717/140 |
| 2012/0222025 | A1 | 8/2012 | Pandit |

OTHER PUBLICATIONS

"Cheng, Technical guide for porting applications from Solaris to Linux, Version 1.0; Feb. 12, 2002; URL:http://www.ibm.com/developerworks/eserver/articles/porting_linux/".

"Chu, ""appcert: A Static Application Checking Tool""; Jun. 2001URL:http://developers.sun.com/solaris/articles/appcert.html".

Clarke et al. "Program Compatiliblity Approaches", Springer-Verlag, 2006, 16pg.

"Debian Project, ""Debian Change log icheck (0. 9. 7-6.1 )""; Mar. 20, 2005; URL:http://packages.debian.org/changelogs/pool/main/i/icheck/icheck_0. 9.7-6.1/changelog".

Jones, "Deducing an Applications use of API's" Feb. 18, 1997, URL: http://www.knosof.co.uk/apichk.html.

"Subbarao; The Technology Behind LynxOS v4.0's Lunix ABI Compatibility; Jun. 4, 2004, URL:http://www.lynuxworks.com/products/whitepapers/compatibility.php3".

Sun, Solaris ABI Tools; Dec. 25, 2004, URL: http://web.archive.org/web/20041225005330/http://www.sun.com/software/solaris/programs/abi/.

Sun Microsystems, "A Practical Guide to Adopting the Solaris 8 OS: Part 3"; Jul. 2000; URL:http://developers.sun.com/solaris/articles/solaris8/solaris8_wp3.html.

USPTO; Office Action for U.S. Appl. No. 13/035,053, mailed Feb. 22, 2013.

USPTO; Office Action for U.S. Appl. No. 13/035,053, mailed Jun. 26, 2013.

USPTO; Office Action for U.S. Appl. No. 13/035,053, mailed Oct. 21, 2013.

USPTO; Office Action for U.S. Appl. No. 13/035,053, mailed May 1, 2014.

USPTO; Office Action for U.S. Appl. No. 13/035,053, mailed Aug. 13, 2014.

USPTO; Office Action for U.S. Appl. No. 11/268,487, mailed Dec. 11, 2009.

USPTO; Office Action for U.S. Appl. No. 11/268,487, mailed May 13, 2010.

USPTO; Office Action for U.S. Appl. No. 11/268,487, mailed Sep. 1, 2010.

USPTO; Office Action for U.S. Appl. No. 11/268,487, mailed Feb. 7, 2011.

USPTO; Office Action for U.S. Appl. No. 11/268,487, mailed Oct. 17, 2011.

USPTO; Office Action for U.S. Appl. No. 11/268,487, mailed Apr. 25, 2012.

USPTO; Notice of Allowance for U.S. Appl. No. 11/268,487, mailed Aug. 9, 2012.

* cited by examiner

RECORDING APPLICATION CONSUMPTION DETAILS

TECHNICAL FIELD

This disclosure relates to the field of computer programs and, in particular, to recording application consumption details from different library interfaces provided by an operating system.

BACKGROUND

An operating system (OS) is software, consisting of programs and data, that runs on processing devices such as computers. The OS manages the computer hardware and provides common services for efficient execution of various computer application software programs. The OS may include a number of libraries accessible to a computer application program running on top of the OS. The libraries may provide, for example, well defined programming sequences that the applications can reuse. Numerous interfaces may exist in the OS to allow the application to access the needed libraries.

It may be useful for the OS developer to have information about which OS interfaces are used by certain applications. This information may be referred to as application consumption data. When releasing a new version of an operating system, it may be desirable to carry forward support for interfaces that are heavily consumed by popular applications. In addition, if certain libraries are used more often, the OS may channel resources to the interfaces of that library.

In certain situations, however, the operating system may be provided by one vendor while the application programs may be provided by another vendor. These programs may be referred to as independent software vendor (ISV) applications. In general the operating system, and its creators, may not have access to the source code of an ISV application. Thus, the operating system has no way to tell which OS interfaces are most commonly used by the ISV application.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for consumption data monitoring. In one embodiment, application data usage is collected for different interfaces on host machines running independent software vendor (ISV) computer application programs. This consumption data monitoring allows a vendor of an operating system running on the host machine to certify ISV applications for a particular release of the operating system or layered products.

For an operating system, consumption data monitoring includes collecting the consumption data and analyzing the data recorded on the host machine which runs the application. In one embodiment, the analysis may be done on a server side. The server may already have interface details for all releases of the operating system. The server may also have algorithms implemented thereon which can provide detailed reports about consumption data of the application on the host machine.

The consumption data may provide several benefits. First, the consumption data is useful in deciding which API (application programming interface) should be given what level of assurance and support by the vendor. If included into business analysis, consumption data reports based on the consumption data, may allow the vendor to allocate correct resources to appropriate areas so as to maximize efficiency of the operating system when working with the ISV application. Second, the consumption data may also allow the vendor to decide whether an ISV application can run on another release of the operating system. It will allow the operating system vendor to provide useful information to the independent software vendors regarding the changes needed to make the applications run properly on future releases of the operating system.

Figure 1:
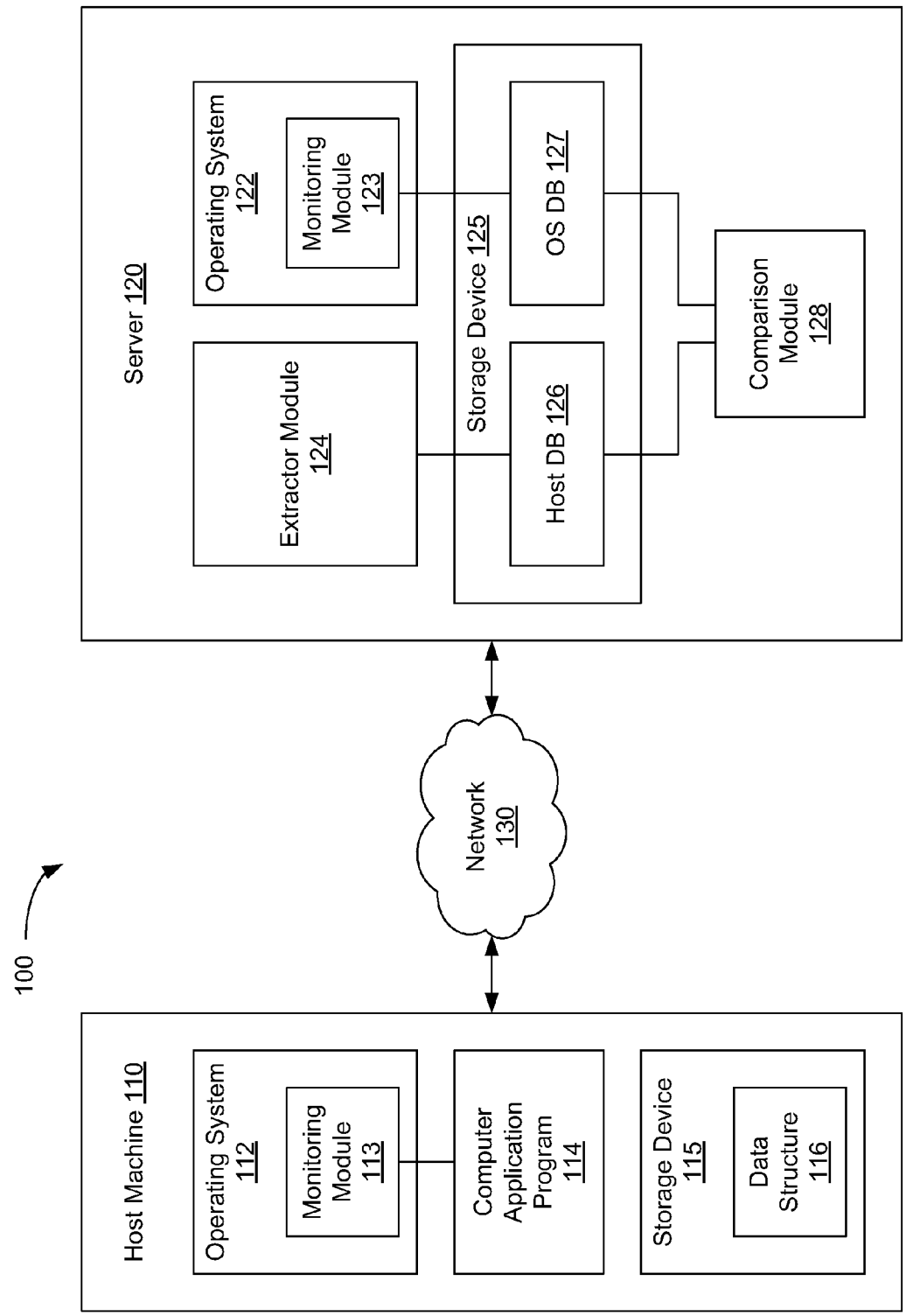
FIG. 1 is a block diagram illustrating a network environment to implement consumption data monitoring, according to an embodiment.

FIG. 1 is a block diagram illustrating a network environment to implement consumption data monitoring, according to an embodiment of the present invention. In one embodiment, network environment 100 includes host machine 110 and server 120. Host machine 110 and server 120 may be connected through a network 130, which may be a local area network (LAN), a wide area network (WAN), a global area network (GAN) such as the Internet, or a combination of such networks. In other embodiments there may be any number of host machines and/or servers in the network environment, however, for ease of explanation, network environment 100 will be described with only one host machine 110 and one server 120.

Figure 4:
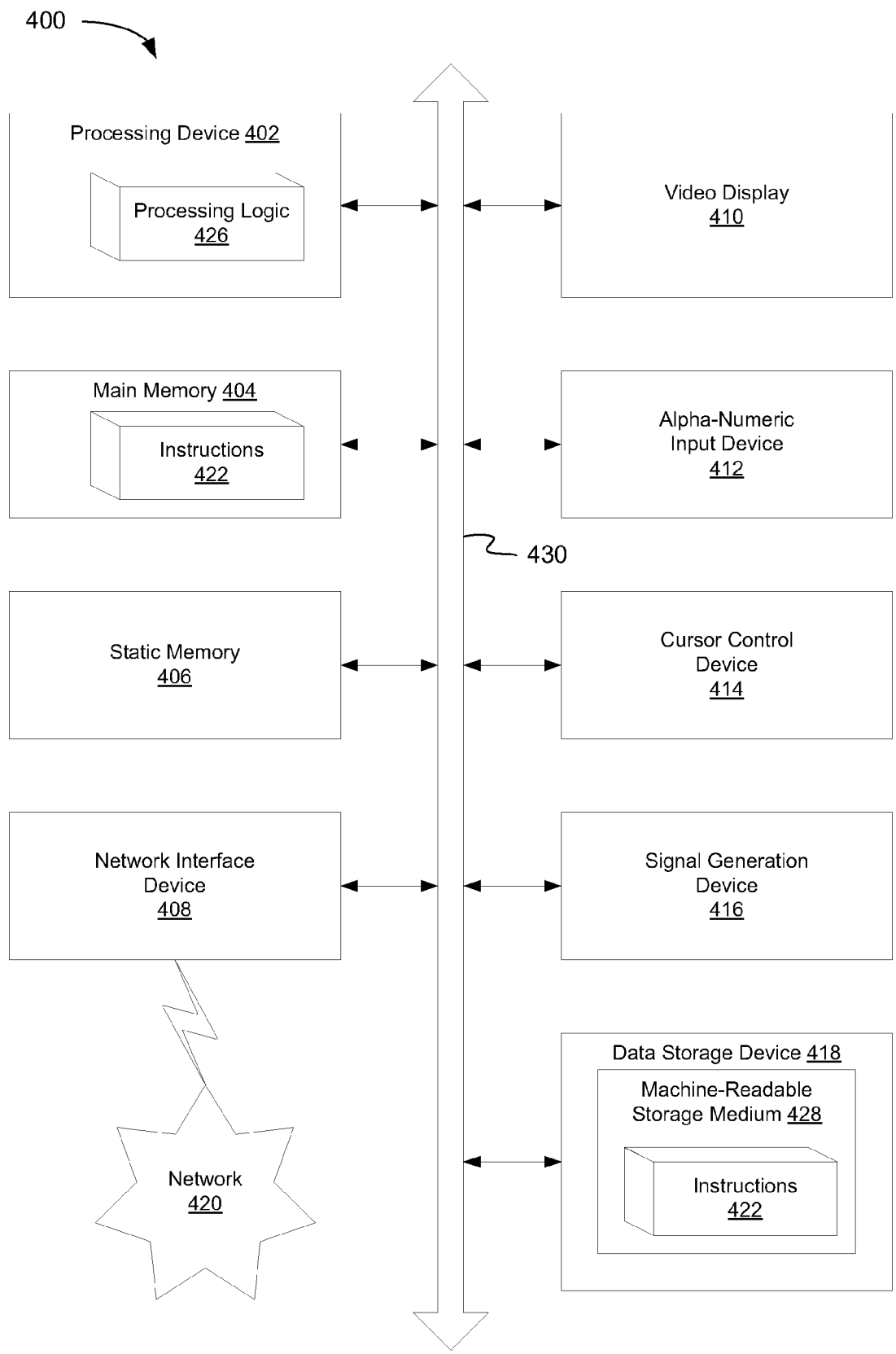
FIG. 4 is a block diagram illustrating one embodiment of a computer system, according to an embodiment.

Host machine 110 may be, for example, a conventional personal computer (PC), workstation, laptop computer, mobile phone, personal digital assistant (PDA) or the like. Host machine 110 may include a processing device, as illustrated in FIG. 4, which runs an operating system 112 and one or more computer application programs 114. Computer application program 114 may be, for example, any program that runs on top of operating system 112 and may be provided by an independent software vendor (ISV). Computer application program 114 may interact with operating system 112, such as by making use of interfaces and libraries provided by operating system 112.

In one embodiment, operating system 112 may include monitoring module 113. Monitoring module 113 may gather consumption data from computer application program 114. Computer application program 114 may interact with interfaces, libraries or other resources provided by operating system 112. Computer application program 114 may make API calls or use other techniques to access these resources. Monitoring module 113 can track and record which resources are consumed by computer application program 114, how often they are accessed, at what rate, etc., and provide that information to server 120 for analysis.

Monitoring module 113 may retrieve a list of all files which are part of computer application program 114 running on host machine 110. In one embodiment, this list can be obtained from listing files inside application specific folders. In other embodiments, the list may be obtained from an application package manager (e.g., an RPM package manager, Windows Installer, or other application package manager), used to maintain many applications. The application program files may include executables, object code, shared libraries, etc. Once the list of application program files is available, monitoring module 113 may segregate all application program files (e.g., executable and linkable format (ELF) files, Portable Executable (PE) files, Mach Object (Mach-O) files, or other files). For GNU/Linux derivative systems this may be done using a program called file. The initial bytes of an ELF file format may be used to recognize the file type. In one embodiment, the first four bytes of an ELF file may have known values, such as for example 0x7f, 0xE, 0xL and 0xF, respectively. For each file belonging to computer application program 114, monitoring module 113 may check the file format and collect a list of all files which have the desired formats. Monitoring module 113 may maintain a list of the files which are part of the computer application program being processed.

For each file identified by monitoring module 113, there is a need to record information from host machine 110. This information may go into a data structure 116 which may be stored in a storage device 115 of host machine 110. Data structure 116 may be in the form of a list, a file, a table, or other data structure. In one embodiment, each element of data structure 116 stores information about a single application program file. Each element may include a dictionary with keys of name, header information, needed libraries, defined symbols, undefined symbols, version index, and version definition. The name key may store a full path of the file along with its name. For other keys, corresponding value details are described below.

Each file may include a header section which includes information about the file. For example, the ELF header may include identification information, ELF type, architecture details, file version and other information. As discussed above, the ELF identification has a number on top which can identify it as ELF file. It may also have ELF class and ELF data encoding details. ELF class information includes a file class or capacity (e.g., if the ELF file class is 32, then it can support machines with files and virtual address spaces up to 4 GB). ELF data encoding details include a decoding technique which was used to create the ELF file. The ELF version information gives details about the ELF file version. The ELF type tells whether the ELF file is relocatable, executable, shared object, core file or some processor specific file. This information can either be obtained from a program which calls ELF library (which can read ELF files) header information get functions or through already existing tools. One example is eu-readelf/readelf program from elfutils/binutils, however, in other embodiments, other tools may be used.

Each file entry in data structure 116 may include a dictionary for storing information. One of the keys of this dictionary is header information. This header information will store a list as a value. This list contains all the information discussed above. In one embodiment, the list has four elements. This first value may be a list containing identification information, the second value may have file type information, the third value may have architecture details, and the fourth value may have the file format version.

For each application program file, monitoring module 113 also recognizes file dependencies. Dependencies may include different libraries which computer application program 114 makes use of. This can be obtained either using already existing tools (e.g., provided by elfutils/binutils) or using libraries which can read the files. Each element in the main dictionary may have needed libraries as a key. This information may be used as value to this key, where the value is a list of libraries needed by the current file.

In addition, for each file there may be symbol table entries. For example, each entry may have symbol name, ndx value and other values. If the ndx value is 'UNDEF' that means symbol is undefined. Undefined symbols or interfaces are resolved with other libraries which provide them as defined symbols and are either locally or globally defined. An ELF file can define certain symbols as global and export them. These in turn can be used by other application libraries. These values may be obtained either from libraries which can read them or from already existing tools. For each symbol, monitoring module 113 separates defined and undefined symbols and records them in data structure 116.

Each interface in the symbol table (.dynsym section) can have an index number associated with it. These details are present in version symbol section (.gnu.version section) of the file (e.g., an ELF file). This index is a reference to either version definition section (.gnu.version_d section) or version needs (.gnu.version_r section) section. For each file, along with list of dependencies, monitoring module 113 recognizes an index associated with each symbol. Monitoring module 113 also recognizes version definition details, as well as version needs details (e.g., from .gnu.version_d section and .gnu.version_r section respectively). These values can be obtained from either libraries (e.g., ELF libraries) or designated tools (e.g., elfutils program eu-readelf/readelf).

Once monitoring module 113 completes the collection of data from computer application program 114, monitoring module 113 may serialize the data in data structure 116 and write it in into a file. Serialization is the process of converting data structure 116 into a sequence of bits. This sequence of bits can be stored in a file and later de-serialized to once again create same data structure or object from which it was created. The resulting file is compressed using a data compression algorithm, such as bzip2, or other algorithm, into a compressed file. The compressed file is uploaded to server 120 over network 130 (e.g., using a protocol such as XML-RPC (extensible markup language—remote procedure call)). In one embodiment, server 120 may provide upload and download facilities by exporting an XML-RPC API which can be used by host machine 110 and other clients to interact with server 120. Server 120 may also provide services for storing certain attributes which belong to a particular compressed file or package being uploaded. These details should allow server 120 to recognize the host (i.e., host machine 110) from which the information has been recorded.

Figure 2:
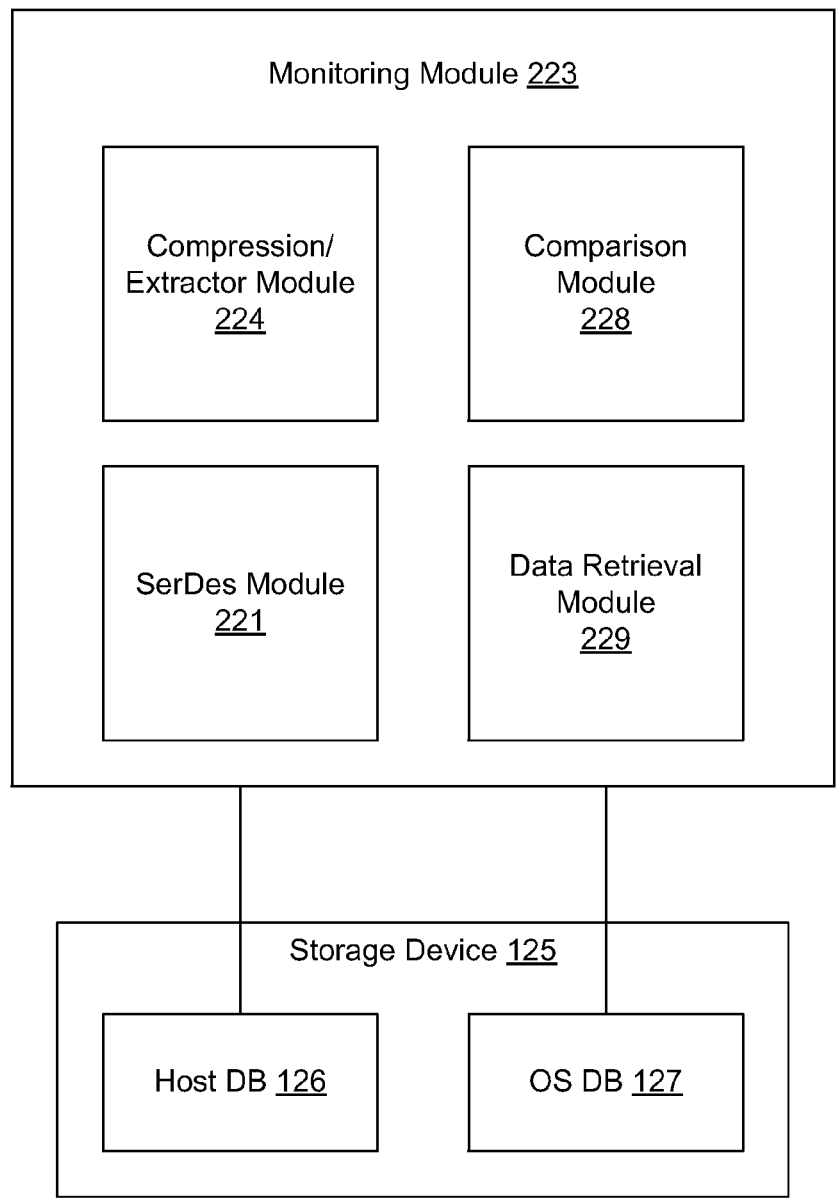
FIG. 2 is a block diagram illustrating a monitoring module for consumption data monitoring, according to an embodiment.

In one embodiment, server 120 includes extractor module 124 which receives the compressed data from host machine 110, and extracts it to get the file on which data structure 116 was serialized on host machine 110. Extractor module 124 may periodically check an upload queue for received uploads. Once a new upload is detected, extractor module 124 retrieves the compressed file or package from the server. In the case where received data is a package, the compressed file may be extracted from the package using tools provided by a package manager. In server 120, extractor module 124 is illustrated as a separate module, however, in one embodiment, as illustrated in FIG. 2, compression/extractor module 224 may be part of monitoring module 223.

Server 120 may further include an operating system 122 which includes monitoring module 123. In one embodiment, operating system 122 is the same operating system as operating system 112 running on host machine 110. A storage device 125 in server 120 stores a host database 126 and an operating system (OS) database 127. Monitoring module 123 may populate OS database 127 with interfaces provided by libraries available in operating system 122. Populating OS database 127 may include several steps. In one embodiment, monitoring module 123 identifies and lists all packages installed on server 120 which provide libraries. Operating system 122 may have a list of available packages which monitoring module 123 may access. Monitoring module 123 then examines all files in a package and records details about all interfaces inside those packages.

Storing operating system related information in OS database 127 may be similar to the process employed on host machine 110. One difference may be that in server 120, details may be stored inside tables rather than inside a mutable data structure. These details (e.g., from ELF files) can be obtained in a similar way as is done on host system 110 (e.g., using either ELF based libraries or already existing commands/programs provided by elfutils/binutils). Monitoring module 123 may examine each identified package and save the package name and version in a package table. For each package, monitoring module may obtain a list of application program files. This can be obtained, for example, using a file command.

OS database 127 may include several tables: package table, file table, dependency table, symbol version table, version needs details table, version definition table and interface table. The package table may store details about the particular package. These details may include the name and other metadata. The file table may contain details about each file inside the main package. This table may have a foreign key entry to the package table. The needed libraries table may have entries for all dependencies per file listed. For a single file, there may be many entries for needed libraries. This table may also have a foreign key to file table. Each needed library for an file may have version details of symbols. These details go to the version needs details table. This table may have a foreign key to the dependency table. Details about what needed libraries, version needs and version definitions are explained above with respect to gathering consumption data on host machine 110. Monitoring module 123 may populate each of these tables with data retrieved from the files, thereby populating OS database 127.

Similar to the populating of data for OS database 127, the data received from host machine 110 may be populated into tables as well. These tables are stored in storage device 125 as host database 126. There may be some differences between host database 126 and OS database 127. In host database 126, the package table is replaced with a host table. The host table may be populated with host details obtained from server 120 which had the compressed file or package uploaded from host machine 110. Additionally, in host database 126, the interface table may be replaced with a defined interface table and an undefined interface table. All defined symbols from data structure 116 may go into the defined interface table and all undefined symbols may go into the undefined symbol table. The remaining tables (e.g., file table, dependency table, symbol version table and version needs table) in host database 126 may be the same as those in OS database 127.

The host database 126 and OS database 127 may be compared in order to analyze the consumption details of computer application program 114 running on host machine 110. In one embodiment, host database 126 and OS database 127 may be compared by comparison module 128. In server 120, comparison module 128 is illustrated as a separate module, however, in one embodiment, as illustrated in FIG. 2, comparison module 228 may be part of monitoring module 223.

For each host having data stored in host database 126, comparison module 128 may check whether each library needed for each file is present in operating system 122. In other words, for each file, comparison module 128 checks to determine whether the needed libraries are found in OS database 127 or if they are provided by the host itself, and thus found in host database 126. In the case where some needed library is missing, then host database 126 is not complete, OS database 127 is not complete, or there is a third party library provider which provides interfaces on host machine 110 that has not been included with the application files. Comparison module 128 may add these libraries to a list of third party or missing libraries.

For each entry of host machine 110 into the file table (i.e., for each file which host machine 110 provides), all undefined symbols should resolve. If they are not resolved and in the case where there is already no file present in the third party or missing libraries list, then there may be a data inconsistency issue. If there is a file present in OS database 127 that is not in host database 126, then we can assume that this symbol interface came from a library which is provided by a third party for which we did not gathered information.

For each undefined interface/symbol, comparison module 128 may search for the symbol name in a list of defined symbols provided by all needed libraries. If a match is found, comparison module 128 may check whether the undefined symbol has an index value. If both the undefined symbol and the needed library have index values, comparison module 128 may check whether the symbols match using the index values. Comparison module 128 may keep track of the provider details and the symbol name which got resolved. This process may be repeated for each undefined symbol provided by host machine 110. In the end, a list of symbols resolved by libraries is created. There may also be a list of unresolved symbols and possibly a list of third party needed libraries which were not found in both host database 126 and OS database 127.

FIG. 2 is a block diagram illustrating a monitoring module 223 for consumption data monitoring, according to an embodiment of the present invention. In one embodiment monitoring module 223 may include serializer/deserializer (SerDes) module 221, compression/extractor module 224, comparison module 228, and data retrieval module 229. Monitoring module 223 may be representative of monitoring modules 113 or 123 of FIG. 1. In one embodiment, monitoring module 223 may be coupled to storage device 125, including host database 126 and operating system database 127.

SerDes module 221 may serialize the data from data structure 116 into a file and compression/extractor module 224 may compress the file using any known compression technique. Similarly, SerDes module 221 may also de-serialize received data and compression/extractor module 224 may extract the data to get the file on which data structure 116 was serialized. As discussed above, comparison module 128 may compare host database 126 and OS database 127. Data retrieval module may gathers a list of files from an ISV computer application program and identify a specific application program file type (e.g., ELF files) by a known sequence stored in a header section of each file. Data retrieval module 229 may extract information from the application program files and may store the extracted information in a data structure on a storage device. Further details of monitoring module 223 may be described below.

Figure 3A:
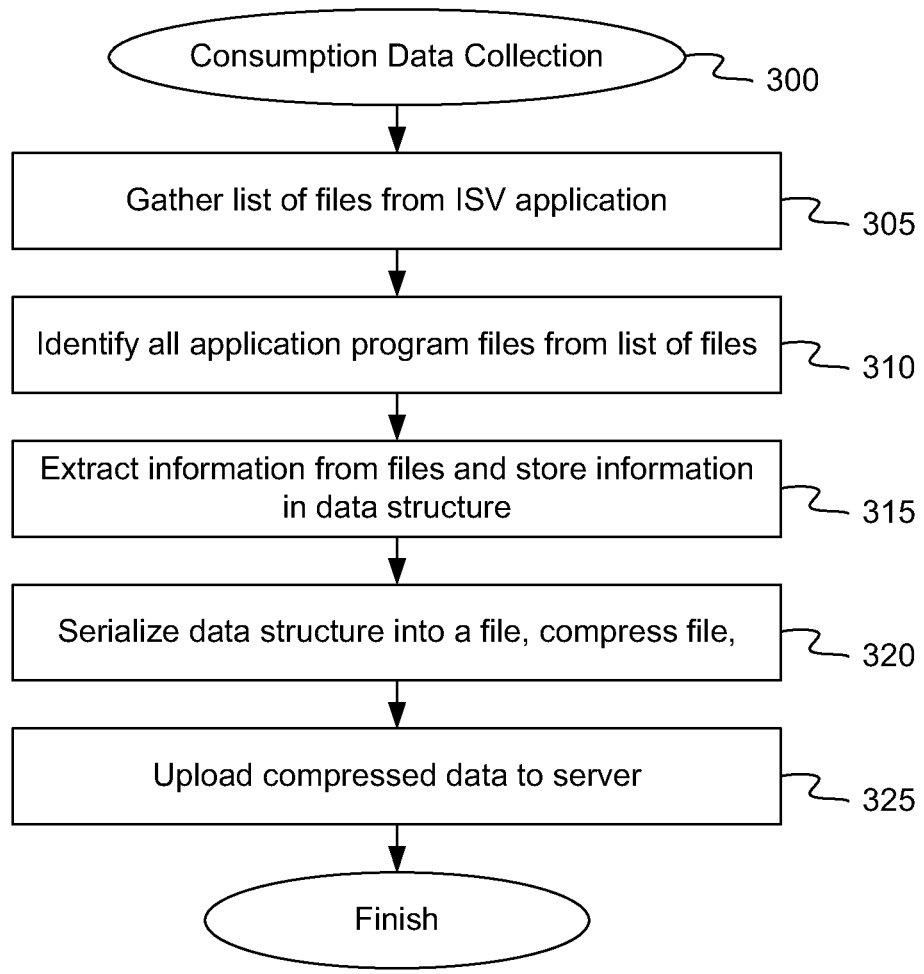
FIG. 3A is a flow diagram illustrating a consumption data collection method, according to an embodiment.

FIG. 3A is a flow diagram illustrating a consumption data collection method, according to an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 collects consumption data of an ISV application running on a host machine. In one embodiment, method 300 may be performed by monitoring module 223, as shown in FIG. 2, which may be running in host machine 110.

Referring to FIG. 3A, at block 305, method 300 gathers a list of files from an independent software vendor (ISV) computer application program. Data retrieval module 229 of monitoring module 223 may retrieve the files from computer application program 114 in host machine 110. At block 310, method 300 identifies all files (e.g., executable and linkable format (ELF) files) from the list of files gathered at block 305. Data retrieval module 229 may identify the files, for example, by a known sequence stored in a header section of each file.

At block 315, method 300 extracts information from the files identified at block 310. Data retrieval module 229 may store the extracted information in a data structure 116 on a storage device 115 of host machine 110. At block 320, method 300 serializes the data from data structure 116 into a file and compresses the file. Serializer/Deserializer (SerDes) module 221 of monitoring module 223 may serialize the data into a file and compression/extractor module 224 may compress the file using any known compression technique. At block 325, method 300 uploads the compressed data to a server 120. Server 120 may be connected to host machine 110 over a network 130.

Figure 3B:
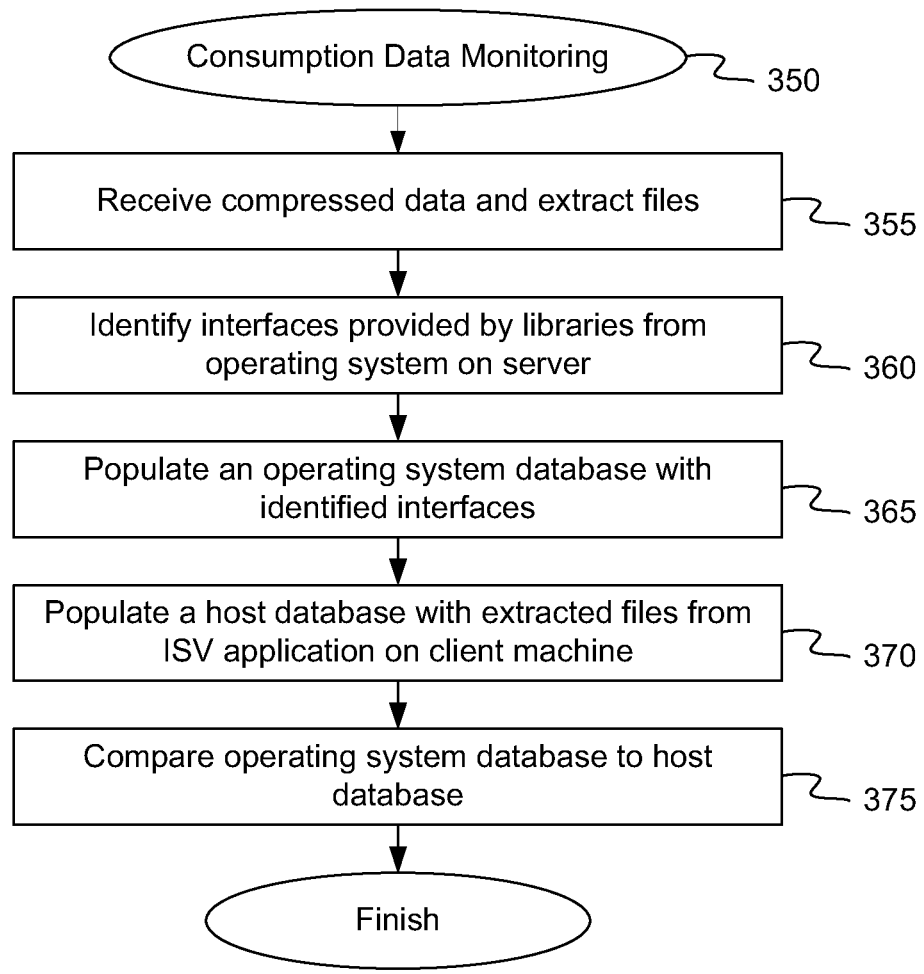
FIG. 3B is a flow diagram illustrating a consumption data monitoring method, according to an embodiment.

FIG. 3B is a flow diagram illustrating a consumption data monitoring method, according to an embodiment of the present invention. The method 350 may be performed by processing logic that comprises hardware (e.g., circuitry, dedicated logic, programmable logic, microcode, etc.), software (e.g., instructions run on a processing device to perform hardware simulation), or a combination thereof. The method 350 receives the collected consumption data and compare it to a version of the operating system running on a server. In one embodiment, method 350 may be performed by monitoring module 223, as shown in FIG. 2, which may be running in server 120.

Referring to FIG. 3B, at block 355, method 350 receives the compressed data and extracts the uploaded files. SerDes module 221 may de-serialize the data and compression/extractor module 224 may extract the data to get the file on which data structure 116 was serialized on host machine 110. At block 360, method 350 identifies interfaces provided by libraries from an operating system on the server. Data retrieval module 229 may scan an operating system 122 running on server 120. The operating system 122 may be the same operating system 112 that is running on host machine 110.

At block 365, method 350 populates an operating system (OS) database with the interfaces identified at block 360. Data retrieval module 229 may create OS database 127 in a storage device 125 of server 120. Data retrieval module 229 stores the identified interfaces and libraries in OS database 127. At block 370, method 350 populates a host database with the extracted files from received from the host machine 110. Data retrieval module 229 may create host database 126 in storage device 125 and store the extracted files representing consumption data from computer application program 114 in host database 126.

At block 375, method 350 compares the host database 126 to operating system database 127. Comparison module 228 of monitoring module 223 may identify needed libraries in host database 126 and search for corresponding library interfaces in OS database 127. Comparison module 228 may generate lists for matching interfaces as well as needed libraries that are not found in OS database 127. These lists may be used to generate detailed reports about consumption details of computer application program 114 on the host machine 110.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428, on which is stored one or more set of instructions 422 (e.g., software) embodying any one or more of the methodologies of functions described herein. The instructions 422 may also reside, completely or at least partially, within the main memory 404 and/or within the processing device 402 during execution thereof by the computer system 400; the main memory 404 and the processing device 402 also constituting machine-accessible storage media. The instructions 422 may further be transmitted or received over a network 420 via the network interface device 408.

The machine-readable storage medium 428 may also be used to store instructions to perform a method 300 for consumption data collection and a method 350 for consumption data monitoring, and/or a software library containing methods that call the above applications. While the machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   identifying, by a server, a first interface provided by a first operating system running on the server;
   populating, by the server, an operating system database with information about the first interface;
   populating, by the server, a host database with consumption details received from a host machine, wherein the host machine is separate and distinct from the server, wherein the consumption details identify one or more interfaces available at the host machine that are used by a computer application program running on the host machine, wherein a second operating system running on the host machine gathers the consumption details, and wherein the second operating system comprises a same operating system as the first operating system;
   determining, by the server, that a second interface among the one or more interfaces is undefined and cannot be resolved by the others of the one or more interfaces;
   comparing, by a processing device at the server, the host database to the operating system database to determine that the first interface available at the server is not available at the host machine;
   determining, by the server, that the first interface resolves the second interface so as to make the second interface defined; and
   identifying, by the server, a possible data inconsistency in response to the determinations that the second interface is undefined and cannot be resolved by the others of the one or more interfaces available at the host machine, that the first interface is not available at the host machine, and that the first interface resolves the second interface.

2. The method of claim 1, further comprising:
   receiving, by the server, a data stream from the host machine, wherein the data stream comprises the consumption details of the computer application program.

3. The method of claim 1, wherein the computer application program is an independent software vendor (ISV) application.

4. The method of claim 1, further comprising:
   generating a report in view of the possible data inconsistency.

5. The method of claim 1, further comprising:
   gathering a list of files associated with the computer application program;
   identifying executable and linkable format (ELF) files from the list of files;
   extracting the consumption details from the ELF files; and
   storing the consumption details in a data structure on the host machine.

6. A system comprising:
   a memory storing instructions; and
   a processing device at a server to execute the instructions to:
   identify a first interface provided by a first operating system running on the server;
   populate an operating system database with information about the first interface;
   populate a host database with consumption details received from a host machine, wherein the host machine is separate and distinct from the server, wherein the consumption details identify one or more interfaces available at the host machine that are used by a computer application program running on the host machine, wherein a second operating system running on the host machine gathers the consumption details, and wherein the second operating system comprises a same operating system as the first operating system;
   determine that a second interface among the one or more interfaces is undefined and cannot be resolved by the others of the one or more interfaces;
   compare the host database to the operating system database to determine that the first interface available at the server is not available at the host machine;
   determine that the first interface resolves the second interface so as to make the second interface defined; and
   identify a possible data inconsistency in response to the determinations that the second interface is undefined and cannot be resolved by the others of the one or more interfaces available at the host machine, that the first interface is not available at the host machine, and that the first interface resolves the second interface.

7. The system of claim 6, wherein the processing device is further to:
   receive, by the server, a data stream from the host machine, wherein the data stream comprises the consumption details of the computer application program.

8. The system of claim 6, wherein the computer application program is an independent software vendor (ISV) application.

9. The system of claim 6, wherein the processing device is further to:
generate a report in view of the possible data inconsistency.

10. The system of claim 6, wherein the processing device is further to:
gather a list of files associated with the computer application program;
identify executable and linkable format (ELF) files from the list of files;
extract the consumption details from the ELF files; and
store the consumption details in a data structure on the host machine.

11. A non-transitory machine readable storage medium storing instructions that, when executed by a processing device, cause the processing device to:
identify, by a server, a first interface provided by a first operating system running on the server;
populate, by the server, an operating system database with information about the first interface;
populate, by the server, a host database with consumption details received from a host machine, wherein the host machine is separate and distinct from the server, wherein the consumption details identify one or more interfaces available at the host machine that are used by a computer application program running on the host machine, wherein a second operating system running on the host machine gathers the consumption details, and wherein the second operating system comprises a same operating system as the first operating system;
determine, by the server, that a second interface among the one or more interfaces is undefined and cannot be resolved by the others of the one or more interfaces;
compare, by a processing device at the server, the host database to the operating system database to determine that the first interface available at the server is not available at the host machine;
determine, by the server, that the first interface resolves the second interface so as to make the second interface defined; and
identify, by the server, a possible data inconsistency in response to the determinations that the second interface is undefined and cannot be resolved by the others of the one or more interfaces available at the host machine, that the first interface is not available at the host machine, and that the first interface resolves the second interface.

12. The storage medium of claim 11, wherein the processing device is further to:
receive, by the server, a data stream from the host machine, wherein the data stream comprises the consumption details of the computer application program.

13. The storage medium of claim 11, wherein the computer application program is an independent software vendor (ISV) application.

14. The storage medium of claim 11, wherein the processing device is further to:
generate a report in view of the possible data inconsistency.

15. The storage medium of claim 11, wherein the processing device is further to:
gather a list of files associated with the computer application program;
identify executable and linkable format (ELF) files from the list of files;
extract the consumption details from the ELF files; and
store the consumption details in a data structure on the host machine.

\* \* \* \* \*